(12) United States Patent
Zacher

(10) Patent No.: US 10,566,591 B2
(45) Date of Patent: Feb. 18, 2020

(54) EMERGENCY DEGASSING ARRANGEMENT FOR A HOUSING IN THE MOTOR VEHICLE SECTOR

(71) Applicant: Dr. Ing. h.c. F. Porsche Aktiengesellschaft, Stuttgart (DE)

(72) Inventor: Marcus Zacher, Sindelfingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 44 days.

(21) Appl. No.: 15/918,283

(22) Filed: Mar. 12, 2018

(65) Prior Publication Data

US 2018/0261814 A1 Sep. 13, 2018

(30) Foreign Application Priority Data

Mar. 13, 2017 (DE) .................. 10 2017 105 286

(51) Int. Cl.
  *H01M 2/12* (2006.01)
  *H01M 2/34* (2006.01)
  *B01D 53/26* (2006.01)

(52) U.S. Cl.
  CPC ........ *H01M 2/1241* (2013.01); *B01D 53/268* (2013.01); *H01M 2/1264* (2013.01); *H01M 2/345* (2013.01); *H01M 2220/20* (2013.01)

(58) Field of Classification Search
  None
  See application file for complete search history.

(56) References Cited

U.S. PATENT DOCUMENTS

| | | |
|---|---|---|
| 4,431,716 A | 2/1984 | Eppley et al. |
| 5,660,944 A | 8/1997 | Sprengel et al. |
| 9,397,325 B2 | 7/2016 | Kinuta et al. |
| 2006/0093895 A1 | 5/2006 | Lim |
| 2013/0032219 A1 | 2/2013 | Heim et al. |
| 2013/0082054 A1 | 4/2013 | Groben |
| 2018/0006342 A1 | 1/2018 | Lee et al. |

FOREIGN PATENT DOCUMENTS

| | | |
|---|---|---|
| CN | 101411004 A | 4/2009 |
| CN | 102916147 A | 2/2013 |
| DE | 4411289 A1 | 10/1995 |
| DE | 102010011878 A1 | 9/2011 |
| DE | 102015011663 A1 | 7/2016 |

(Continued)

OTHER PUBLICATIONS

German Search Report for German Application No. 10 2017 105 286.0, with partial English translation, dated Nov. 23, 2017, 7 pages.

(Continued)

Primary Examiner — Sarah A. Slifka
(74) Attorney, Agent, or Firm — RatnerPrestia

(57) ABSTRACT

An emergency degassing arrangement for a housing in the motor vehicle sector, in particular a battery housing. The housing encloses at least one housing interior and has at least one housing opening which is closed by a covering device. The covering device has at least one membrane, a spike member and a sensor device in such a manner that, when a defined internal pressure in the respective housing interior is exceeded, the sensor device detects the exceeding and the membrane can be destroyed. The spike member is mounted resiliently in the covering device by a spring member.

8 Claims, 2 Drawing Sheets

(56) References Cited

FOREIGN PATENT DOCUMENTS

Figure 1:
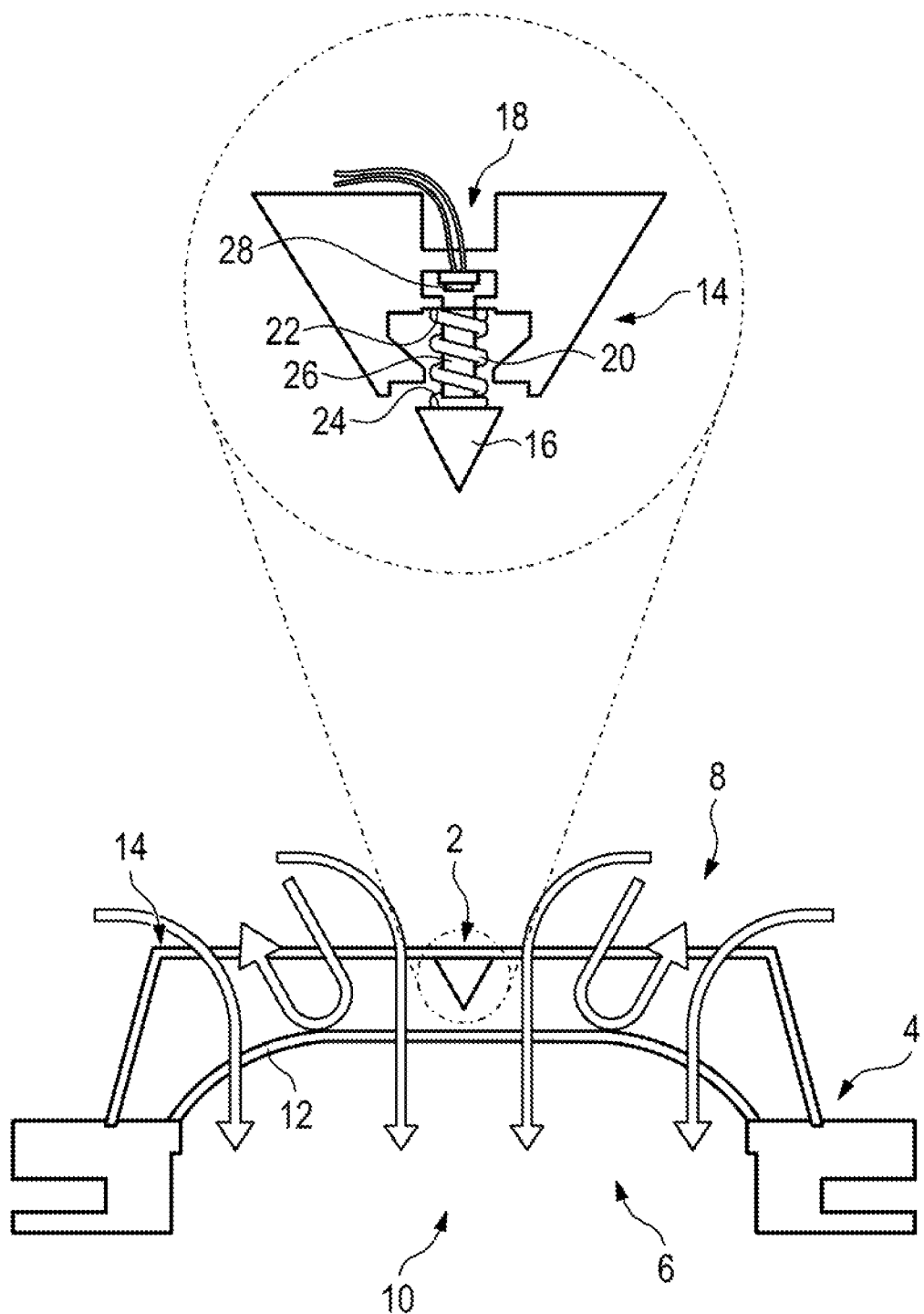

| | | |
|---|---|---|
| JP | H065121 U | 1/1994 |
| KR | 20060037607 A | 5/2006 |
| KR | 101577883 B1 | 12/2015 |
| KR | 20160021347 A | 2/2016 |
| KR | 20160145428 A | 12/2016 |
| WO | 2007093626 A1 | 8/2007 |

OTHER PUBLICATIONS

English translation of the Korean Office Action for Korean Application No. 10-2018-0027280, dated Feb. 14, 2019—5 pages.
English translation of the Chinese Office Action for Chinese Application No. 2018101940949, dated Aug. 27, 2019, 10 pages.

EMERGENCY DEGASSING ARRANGEMENT FOR A HOUSING IN THE MOTOR VEHICLE SECTOR

CROSS-REFERENCE TO RELATED APPLICATION

This application claims priority to German Patent Application No. DE 10 2017 105 286.0, filed Mar. 13, 2017, which is incorporated by reference herein in its entirety.

FIELD OF THE INVENTION

The invention relates to an emergency degassing arrangement for a housing in the motor vehicle sector, in particular a battery housing, wherein the housing encloses at least one housing interior and has at least one housing opening which is closed by a covering device, wherein the covering device has at least one membrane, a spike member and a sensor device in such a manner that, when a defined internal pressure in the respective housing interior is exceeded, the sensor device detects said exceeding and the membrane can be destroyed.

BACKGROUND OF THE INVENTION

An emergency degassing device of this type, for example for venting battery housings, is known from DE 10 2015 011 663 A1, which is incorporated by reference herein, Firstly, said emergency degassing device is intended to ensure that an increased internal gas pressure can be safely conducted out of the housing before the housing is damaged per se, and, secondly, is intended to ensure that this state can be signaled by a display device or sensor device in order to inform a user about the excessive internal housing pressure and therefore associated damage to the battery. However, the emergency degassing arrangement described here has the disadvantage of being of relatively complicated design, wherein, for the actuation of the switching device and release of the spike member, a movable housing part is provided which, in the extreme case, can tilt and therefore obstruct, if not even prevent, emergency degassing.

SUMMARY OF THE INVENTION

The spike member is mounted resiliently in the covering device by means of a spring member. The spring characteristic can be configured here in such a manner that, when there is a defined movement travel, the force to be applied for this purpose is of such a magnitude that the spike member destroys the membrane.

In a particularly advantageous embodiment, the covering device has a spike housing part on which the spring member is supported at a first end, and wherein a second end of the spring member lies against the spike member. By this means, the covering device can be premanufactured in a simple manner and inserted in a functionally reliable manner during installation of the housing.

In an advantageous manner, the spike member has a spike plunger which is operatively connected to the sensor device.

In a particularly advantageous embodiment, the spring member is designed as spiral spring wherein the spike plunger reaches into the spiral spring.

In an advantageous manner, the sensor device has a switching member which is actuable by the spike plunger in the event of a defined excess pressure. The switching member can be designed here as a pressure-sensitive switching member against which the spike plunger lies in order not only to indicate the defined excess limit pressure, but also to be able to indicate an excess pressure situation which is not yet critical in terms of safety, but provides the user with the possibility of initiating repair measures without the membrane being destroyed.

Alternatively, the spike plunger itself can also be designed as a spring plunger.

Furthermore, it is advantageous if the sensor device has a contactless sensor which detects a movement travel of the spike member or of the spike plunger in order also to perceive if a situation which is critical in terms of safety is arising.

The membrane can be designed in an advantageous manner as a semipermeable membrane which permits ambient air to pass through, but does not let moisture into the housing interior.

BRIEF DESCRIPTION OF THE DRAWING FIGURES

Figure 2:
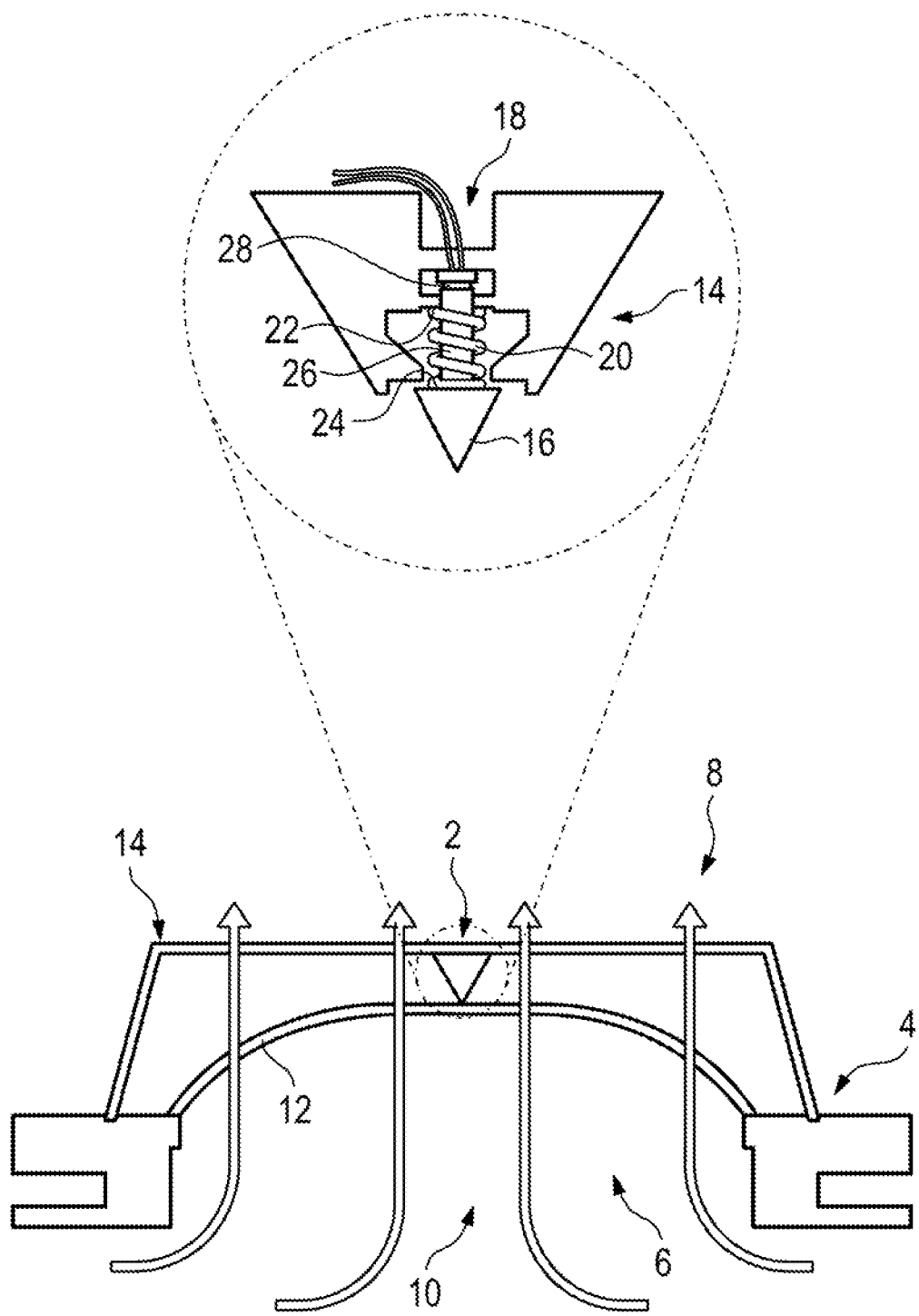

The invention is illustrated in more detail with reference to a drawing, in which:

FIG. 1 shows a schematic sectional view of an emergency degassing arrangement according to aspects of the invention with an undeformed membrane, and FIG. 2 shows the emergency degassing arrangement according to FIG. 1 with a deformed membrane, wherein a region of a covering device is in each case illustrated in enlarged form.

DETAILED DESCRIPTION OF THE INVENTION

FIG. 1 shows a schematic sectional view of an emergency degassing arrangement 2 for a sealed housing 4 of a battery (not illustrated further) which is used in the motor vehicle sector. In the normal operating state of the battery, a housing opening 6 of the housing 4 is closed by a covering device 8 in such a manner that a housing interior 10 is sealed fluid-tightly. In the present exemplary embodiment, the covering device 8 has a membrane 12, a spike housing part 14, a spike member 16 and a sensor device 18. The spike member 16 is mounted resiliently in the spike holder 14, and therefore in the covering device 8, by means of a spring member 20 which is designed as a spiral spring in the exemplary embodiment. In the normal operating state, the membrane 12 is located at a distance from the spike member 16, as illustrated in FIG. 1. In the present exemplary embodiment, the membrane 12 is designed as a semipermeable membrane which lets ambient air into the housing interior 10, but is impermeable to moisture.

As already indicated, the covering device 8 has a spike housing part 14 on which the spring member 20 is supported at a first end 22, The second end 24 lies against the spike member 16. The spike member 16 furthermore has a spike plunger 26 which reaches through the spring member 20 and via which a switching member 28 of the sensor device 18 is actuable.

FIG. 2 now shows the housing 4 in an operating situation which is critical in terms of safety and in which the battery emits gas, for example due to an overload, as a result of which the internal pressure in the housing interior 10 rises and the semipermeable membrane 12 is pressed in the direction of the spike member 16. Owing to the fact that the spring rigidity of the spring member 20 is designed to be less than the strength of the semipermeable membrane 12, the spike member 16, and therefore the associated spike plunger 26, is moved in the direction of the switching member 28 of the sensor device 18, wherein the switching member 28 is designed as a pressure-sensitive switching member. In the event of contact of the spike plunger 26 with the pressure-sensitive switching member 28, a signal is triggered, by means of which the battery can be deactivated in order to avert greater damage. If an internal pressure rises further, the membrane is ultimately destroyed by the spike member 16, and therefore the internal pressure in the housing interior 6 can be rapidly dissipated.

In an alternative embodiment, the spike plunger 26 can be designed as what is referred to as a spring plunger which already lies against the switching member 28 in the starting situation and has a spring rigidity which is substantially less than the strength of the semipermeable membrane 12. Furthermore, it is conceivable also to provide contactless sensors in the region of the spike plunger 26, which sensors can detect a movement travel of the spike member 16 or of the spike plunger 26 and can therefore promptly emit a signal regarding a change in pressure in the housing interior 6.

What is claimed is:

1. An emergency degassing arrangement for a battery housing in a motor vehicle, wherein the housing encloses at least one housing interior and has at least one housing opening which is closed by a covering device, wherein the covering device has at least one membrane, a spike member and a sensor device in such a manner that, when a defined internal pressure in the respective housing interior is exceeded, the sensor device is configured to detect said exceeding of the defined internal pressure and the membrane is configured to be destroyed, wherein the spike member is mounted resiliently in the covering device by a spring member, wherein the spike member has a spike plunger which is operatively connected to the sensor device.

2. The emergency degassing arrangement as claimed in claim 1, wherein the covering device has a spike housing part on which the spring member is supported at a first end, and wherein a second end of the spring member lies against the spike member.

3. The emergency degassing arrangement as claimed in claim 1, wherein the spring member is configured as a spiral spring, wherein the spike plunger reaches into the spring member.

4. The emergency degassing arrangement as claimed in claim 1, wherein the sensor device has a switching member which is actuable by the spike plunger.

5. The emergency degassing arrangement as claimed in claim 4, wherein the switching member is configured as a pressure-sensitive switching member against which the spike plunger lies.

6. The emergency degassing arrangement as claimed in claim 1, wherein the spike plunger is configured as a spring plunger.

7. The emergency degassing arrangement as claimed in claim 1, wherein the sensor device has a contactless sensor which detects a movement travel of the spike member or of the spike plunger.

8. The emergency degassing arrangement as claimed in claim 1, wherein the membrane is a semipermeable membrane.

* * * * *